Dec. 6, 1966 H. A. WILSON 3,289,968
KITE REEL
Filed Oct. 7, 1965 2 Sheets-Sheet 1
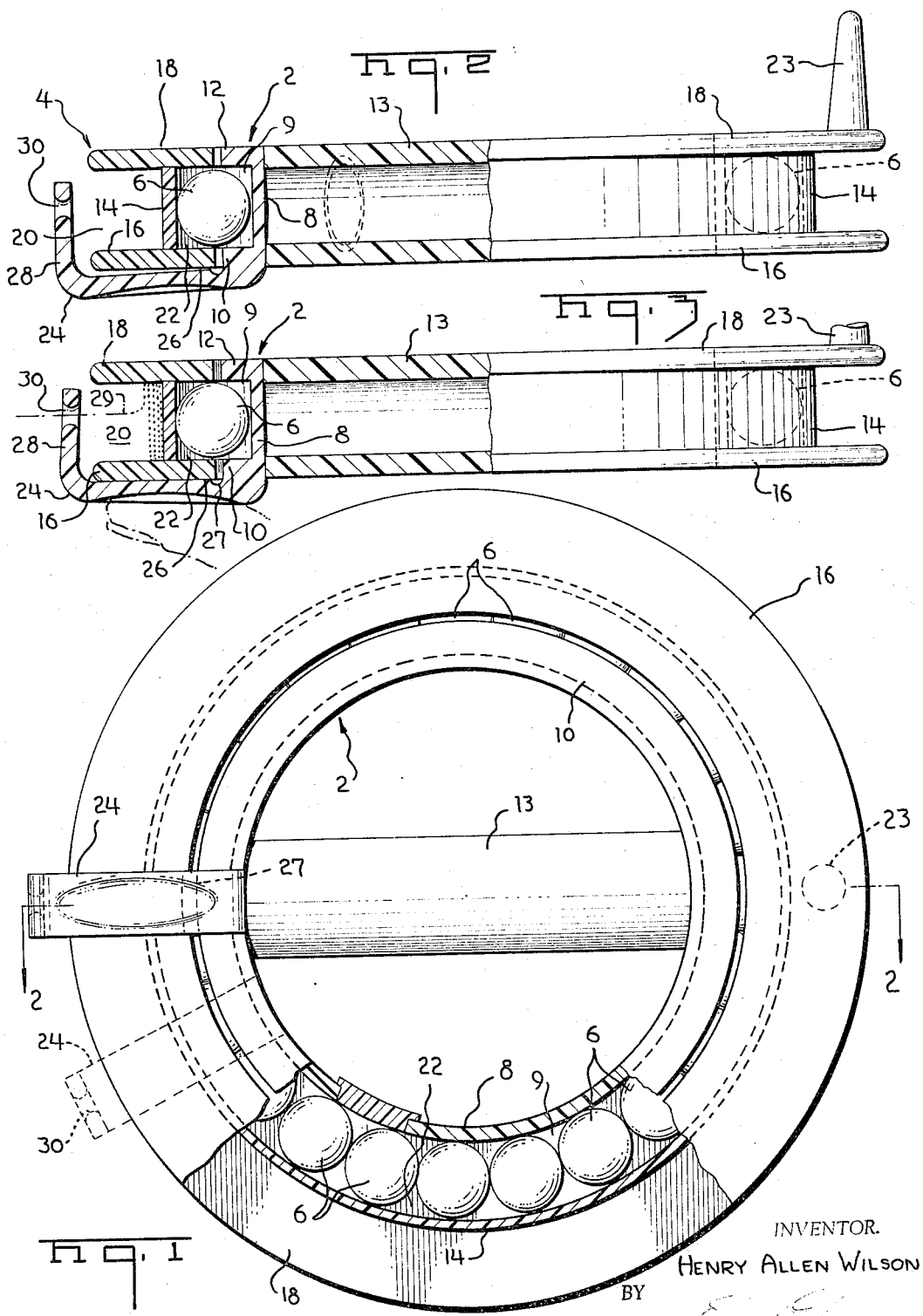
INVENTOR.
HENRY ALLEN WILSON Dec. 6, 1966 H. A. WILSON 3,289,968
KITE REEL
Filed Oct. 7, 1965 2 Sheets-Sheet 2
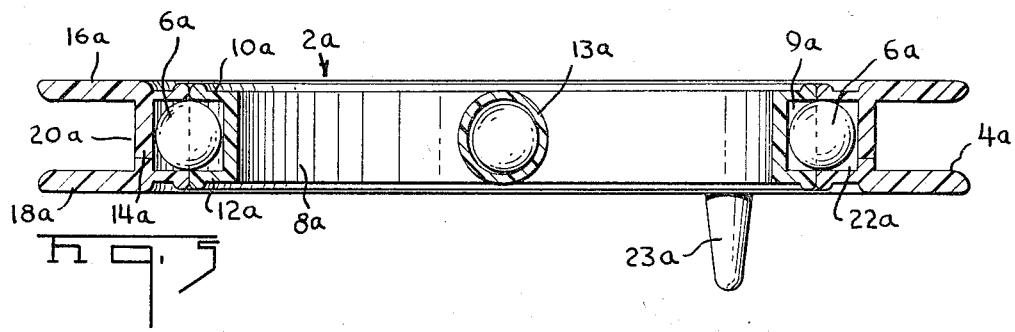
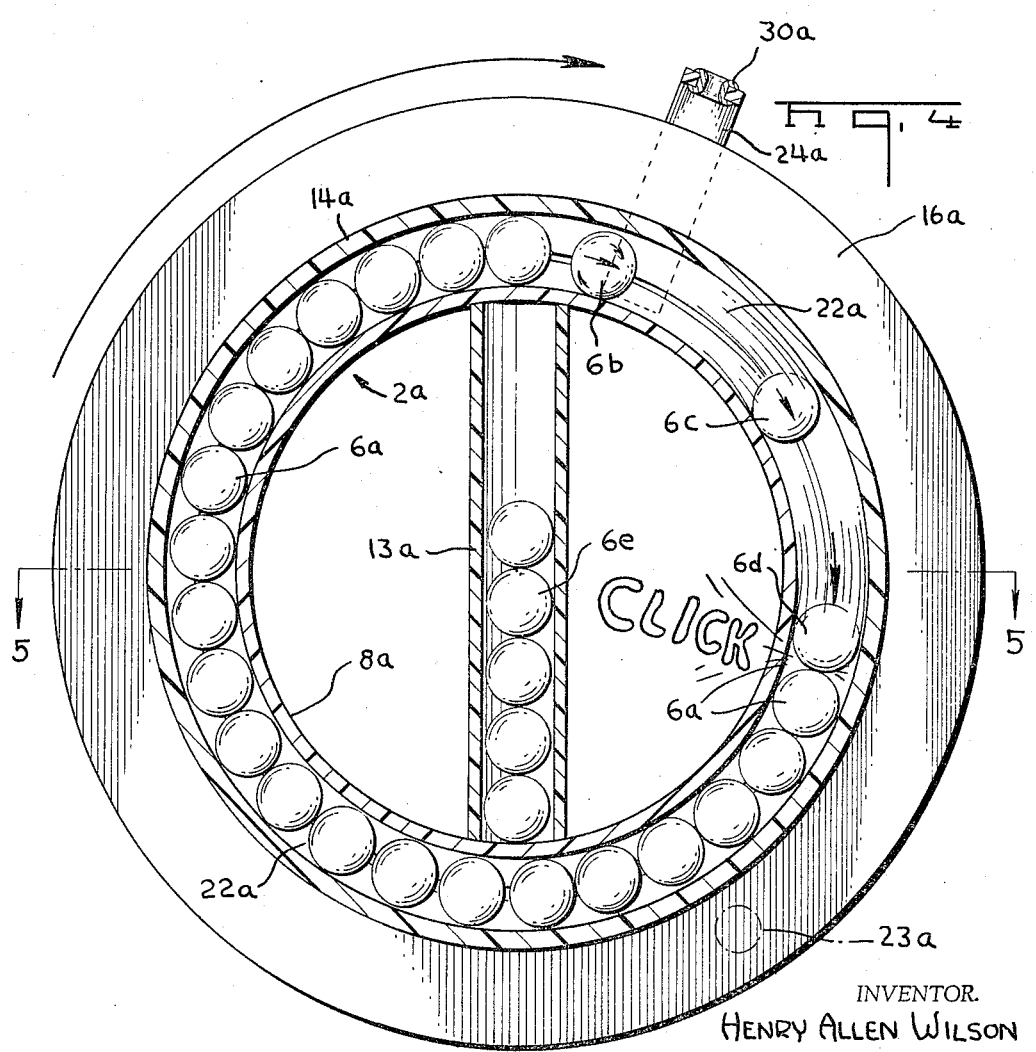
INVENTOR.
HENRY ALLEN WILSON
BY 3,289,968
KITE REEL
Henry Allen Wilson, 1000 Eldorado Ave.,
Clearwater Beach, Fla.
Filed Oct. 7, 1965, Ser. No. 493,200
13 Claims. (Cl. 242—96)

This application is a continuation-in-part of my application filed June 16, 1964, Serial No. 375,462, now abandoned.

This invention relates to a hand carried and operated transparent plastic reel and more particularly to such a reel adapted for use in the flying of kites.

The loads involved in the flying of kites are relatively light but the manipulation of the reel to apply the proper tension to the kite line therefrom requires dexterity.

It is therefore an object of this invention to provide a reel which can be readily carried about in one hand and manipulated at will by that hand to guide and brake the connected line of a kite in flight, to release and/or apply the proper tension to such line from the reel at all times and without interferring with the proper movements of the person controlling the kite in doing so.

It is a further object of this invention to provide a reel which will permit the line thereon to pay out under the control of an operator only as desired without increase of tension due to the friction of the reel.

It is an important and further object of the invention however, to provide in a single hand carried reel having combined aligned line guiding and braking means whereby to secure all parts thereof positively so as to control the tension and paying out of the line according to the will of the operator, or substantially aligned as indicated in dotted lines.

A still further object of this invention relates to a hand held and manipulated kite flying reel in which the antifriction elements thereof are constructed and arranged to produce a succession of sounds upon normal operation thereof.

Another object of my invention has to do with color changing and displaying aspects of the transparent plastic kite flying reel during operation thereof.

These and other objects of the invention will be manifest upon a reading of the following description in conjunction with the accompanying drawing wherein:

FIG. 1 is a side view of the reel of the invention;

FIG. 2 is a section taken on the line 2—2 of FIG. 1, showing the aligned relationship of the hand supporting means, the spool braking means and the line tensioning and guiding means;

FIG. 3 is a view similar to FIG. 2 showing the brake applied for preventing relative rotation of the spool and/or required tensioning of the line, as indicated in dotted lines;

FIG. 4 is a view similar to FIG. 1, but illustrating a vertical section through a modified form of the reel showing the desired circumferential spacing of regular marble bearing members therein which allows free gravity travel of successive marbles during operation as shown; and FIG. 5 is a transverse section through the reel taken on the line 5—5 of FIG. 4.

Now with reference to the drawings, there is shown an inner annular channeled support 2 having mounted and laterally retained thereon a channel ring or spool 4 by means of relatively large antifriction balls 6, hereinafter described.

The support 2 comprises a cylindrical body 8 having at each side thereof annular radially projecting spaced flanges 10 and 12 defining therebetween a ball supporting channel 9 which provides generally square U-shaped channel in cross-section. A tubular hand gripping handle member 13 is positioned along a diameter within and secured integrally at both ends thereof to the inner annular wall of the cylindrical body 8 to serve as a positive radially extending body means for manipulating the kite spool in use.

The spool 4 comprises a similar short cylinder body 14 having at each side thereof inwardly and outwardly extending annular flanges 16 and 18 respectively which define therebetween oppositely facing annular channels 20, 22 from the intermediately disposed cylindrical body 14. Each said channel is also of generally square U-shape in cross section with the inner annular channel 22 being inverted and facing the channel 9 but slightly spaced therefrom. A finger grasping crank 23 is secured to one side of the annular outer flange 18 for rotating the spool 4. The antifriction balls 6 which as shown may be ordinary glass or china marbles, are mounted within the oppositely facing channels 9 and 22 to freely mount the spool 4 for antifriction rotation on the channeled cylindrical support 2 and to key both spool and support against axial separation. As shown the inner and outer channeled spool and supporting body members are preferably made of a transparent readily moldable plastic material.

In combination with the foregoing, an L-shaped combined line guide and braking member 24, also of said plastic material, is shown secured to or made integral with the annular flange 10 of the support. Said L-shaped member 24 is shown shaped to normally remain spaced from the flat side face 16 of the flange as indicated at 26 in FIG. 2 and has its outer leg or end 28 turned or angled to overlay the outer open channel of the normally freely rotatable spool 4 and is provided with a line guiding aperture 30 for freely feeding and guiding a line indicated at 29 by dotted lines in FIG. 3, as it is wound and unwound from the storage channel 20 of the spool 4 and for tensioning said line. The groove 27 insures proper flexing.

In use when flying a kite the hand grip or handle 13 is adapted to be grasped by the four fingers of one hand and will thus position the thumb over the aligned member 24. By applying lateral pressure with the thumb the inner side of the member 24 may be flexed against the adjacent relatively wide and flat face of flange 16 to apply a braking force to the spool which may thus be readily varied as required to stop the spool and/or tension the kite line wound thereon as indicated at 29 in dotted lines in FIG. 3. The inherent tendency of the member 24 to assume the position spaced from the flange releases the braking force. The line on the spool is passed through the guide opening 30 through which it can be released or tensioned by regulating the thumb holding pressure on the brake and when desired the line may be returned to the spool by reversely rotating the crank 23.

As stated above, I prefer to make the reel of a moldable plastic material such as "Lucite" which allows for simple and economical manufacture and assembly by molding and/or bonding or parts as required. This will readily allow for the glass balls to be assembled in the positions shown while one of the flanges remains unassembled or they may be added to or removed from such positions by removal of a plug. In such an event the final step of the assembly consists merely in bonding the last flange or other part to the proper cylindrical body as the case may be.

While the generally L-shaped combined brake and line guide member 24 is shown in the full line position in substantial axial alignment with the hand grip or handle 13, for normal convenient and intended line controllable pressure by the thumb of the hand grasping said handle, it is, of course, understood that the precise positioning of the member 24 may be altered slightly, for such purpose, as indicated by dotted line in FIG. 1, within the spirit of the invention and requirements of an operator.

Now with reference to FIGS. 4 and 5 of the drawing, I have shown a slightly modified form of the invention in which the spool 4a is keyed to the inner annular channel support 2a by means of an incomplete circumferential series of relatively large antifriction glass balls 6. These balls may be ordinary colored or transparent marbles which are usually made of glass or similar hard and highly polished spherical bodies in bright or varigated colors. The primary difference here however is that a substantial annular space is left in the antifriction ball race, i.e., between the touching or substantially touching annular series of glass balls 6a. Further it has been found that this intervening space shown in FIG. 4 between balls 6b and 6d should not materially exceed one quarter of the circumference of this raceway. In this arrangement and manner the spool 4a is at all times firmly held and antifrictionally keyed and held concentrically on the inner annular channeled support.

By the construction and arrangement of parts just described, the uppermost glass balls 6b in the raceway are caused to progressively cascade under the action of gravity and operation of the spool 4a or both, and fall through the annular space just described see ball 6c–6d and shown at "click" in the drawing, and forcibly strike the last of the series of antifrictional balls toward the bottom of the raceway. A successive series of relatively loud and distinct "cracking"-like sounds are thus produced as one glass ball forcibly strikes upon another in the race as the spool is rotated in either direction, all as indicated in FIG. 4.

It will be noted that the operation just described may be continued indefinitely and the spool remain concentrically centered by the balls on the channeled hand held support by the touching series of balls of the raceway extending substantially 180° of the circumference of the raceway.

With this combination and arrangement of parts as described the kite flying and controlling reel is also an attractive sound producing device which character of sounds adds materially to its used during control of a kite in flight. Such a sound producing means is also operative as a signalling means at times of paying out or on winding in of a kit line.

It will also be important to note that a further function and advantage obtained by the use of more or less ordinary marbles in the construction and operation of my kite reel, as described, is that said marbles are readily obtainable and in various colors and combinations of colors and are highly polished, hard and truly spherical. Hence, such marbles not only serve the function of much more expensive balls but add materially to the aesthetic appearance of the reel in use, particularly when all parts thereof are constructed of transparent material.

It will also be observed in the normal use of my improved reel for the flying of a kite that the perfect control is obtained primarily from the combination and arrangement of the centrally disposed cylindrical handle 13a which is secured to the circumferentially channeled support 2a along a diameter thereof and the combined line guide and spool brake 24a, all of which may be integral as shown in FIGS. 1 and 4, which is important in controlling the annular flat surfaced flange 16a.

From these showings it will be noted that the line guide member and brake 24a is positioned for use with the right hand and thumb of an operator wherein this thumb deflectable portion of the hand held support may provide the combined means for the control of a kite during flying.

During the operation and kite control just described the spool is thus bound rigidly and non-rotatively to the support by the brake means and the line guide moved therewith as a unit as required from the normal vertical position of FIG. 4 to the more or less horizontal position of FIG. 5.

During this operation in the flying of a kit the central tubular handle 13a which may also be formed of transparent material and partially filled with colored glass or ceramic marbles 6e as shown in FIGS. 4 and 5, is moved correspondingly causing the marbles therein to strike on each other and produce sounds, which sounds may be the same or different from that of the antifriction balls of the spool.

My invention has been thoroughly tested and found to be completely satisfactory for the accomplishment of the above objects and while I have shown and described a preferred embodiment, I wish it to be specifically understood that the same is capable of modification without departure from the spirit and scope of the appended claims.

I claim:

1. In a kite flying reel and noise making device comprising a pair of concentric members, facing channels in said members defining a circumferential space therebetween, and a plurality of roller elements freely mounted in and incompletely filling the circumferential extent of said space by at least the diameter of several rollers for producing successive noise making function on rotation of said members.

2. A device as defined in claim 1 wherein the annular series of roller elements may extend in contact over 180° around said circumferential space to insure proper continuous concentric support and drive of the members.

3. A device as defined in claim 2 wherein the rollers are made of colored ceramic material.

4. A device as defined in claim 2 wherein the rollers are glass balls.

5. A kite reel and noise producing device comprising an annular support having a channel in the periphery thereof, a spool mounted and supported concentrically with said support and having inner and outer oppositely facing channels therein, said inner channel facing the first mentioned channel and forming therewith an annular space, and a plurality of roller elements freely mounted in and incompletely filling the circumferential extend of said space by at least the diameter of several rollers when in a contacting row therein.

6. A device as defined in claim 5 wherein the roller elements extend over substantially 180° around said space when in a contacting row therein.

7. A device as defined in claim 6 wherein the rollers are made of glass.

8. A device as defined in claim 7 wherein the rollers are colored glass balls.

9. A device as defined in claim 8 wherein the support and spool are of a synthetic plastic.

10. A devcie as defined in claim 5 further including a hollow hand member secured to the support along a diameter thereof.

11. A device as defined in claim 5 wherein a plurality of marbles are supported in said hollow handle for relative movement therewithin.

12. A kite flying reel comprising a hand held support and a spool concentrically disposed on said support, facing channel walls on said support and spool defining a circumferential raceway therebetween, spaced annular flange walls disposed at each side of said channels to define a U-shaped raceway, and an annular series of marbles of a diameter substantially equal to the width of the spool contacting the walls of said raceway between said channels and flanges and keying said spool concentrically on said support.

13. In a device as covered in claim 12 and a deflectable braking member projecting radially from said support along one side of a flange of said spool for controlling the relative rotation of said spool and support.

References Cited by the Examiner
UNITED STATES PATENTS

| | | | |
|---|---|---|---|
| 2,250,281 | 7/1941 | Sundstrand | 242—96 |
| 2,587,432 | 2/1952 | Bellah | 242—96 |
| 3,006,574 | 10/1961 | Hardy | 242—99 X |

FRANK J. COHEN, *Primary Examiner.*
STANLEY N. GILREATH, *Examiner.*
N. L. MINTZ, *Assistant Examiner.*